US006240819B1

(12) United States Patent
Su et al.

(10) Patent No.: US 6,240,819 B1
(45) Date of Patent: Jun. 5, 2001

(54) APPARATUS FOR CUTTING A SCRAP TIRE

(75) Inventors: Tung-Ming Su, Kaohsiung; Chung-Hsien Kang; Bor-Jang Wu, both of Kaohsiung Hsien, all of (TW)

(73) Assignees: Autop Precision Machinery Co., Ltd., Kaohsiung (TW); Fujix Co., Ltd., Tokyo (JP)

( * ) Notice: Subject to any disclaimer, the term of this patent is extended or adjusted under 35 U.S.C. 154(b) by 0 days.

(21) Appl. No.: 09/298,557

(22) Filed: Apr. 22, 1999

(51) Int. Cl.[7] .......... B23B 5/14

(52) U.S. Cl. .......... 83/176; 83/951; 83/923; 83/733; 83/460; 82/101

(58) Field of Search .......... 83/951, 923, 184, 83/187, 175, 176, 212.1, 213, 410.9, 410.7, 411.1, 411.5, 733, 101, 460

(56) References Cited

U.S. PATENT DOCUMENTS 1,905,366 * 4/1933 Carlin .......... 83/366
2,213,721 * 9/1940 Skold .......... 83/872
3,415,148 * 12/1968 O'Brien .......... 83/923
3,701,296 * 10/1972 Snow .......... 82/54
3,733,941 * 5/1973 Geyer, Jr. .......... 82/59
4,090,670 * 5/1978 Bennett .......... 241/23
4,096,772 * 6/1978 Hall et al. .......... 82/82
4,134,316 * 1/1979 Bullinger .......... 82/56
4,338,840 * 7/1982 Farrell, Sr. et al. .......... 83/622
4,417,492 * 11/1983 Winecoff .......... 82/46
4,727,786 * 3/1988 Quante et al. .......... 83/923
4,738,172 * 4/1988 Barclay .......... 83/18
5,054,351 * 10/1991 Jolliffe et al. .......... 83/430
5,133,236 * 7/1992 Dudley .......... 83/608
5,199,337 * 4/1993 Parker .......... 83/951
5,531,146 * 7/1996 Pederson .......... 83/951
5,551,325 * 9/1996 Schutt .......... 83/133
5,601,004 * 2/1997 Queen .......... 82/54
5,896,795 * 4/1999 Harhay et al. .......... 83/923

* cited by examiner

*Primary Examiner*—Rinaldi I. Rada
*Assistant Examiner*—Kim Ngoc Tran
(74) *Attorney, Agent, or Firm*—Harness, Dickey & Pierce P.L.C.

(57) ABSTRACT

An apparatus for cutting a scrap tire includes a base with a top face, a vertical shaft mounted on the base, a tire support mounted rotatably on the vertical shaft, and first and second cutting units. The first cutting unit is mounted on the base and is adapted to cut the scrap tire along a first plane that is parallel to the top face of the base. The second cutting unit is mounted on the base and is adapted to cut the scrap tire along a second plane that is perpendicular to the top face of the base.

12 Claims, 7 Drawing Sheets

APPARATUS FOR CUTTING A SCRAP TIRE

BACKGROUND OF THE INVENTION

1. Field of the Invention

This invention relates to a cutting apparatus, more particularly to an apparatus for cutting a scrap tire.

2. Description of the Related Art

It is known that scrap tires are bulky and hard to handle. Therefore, a relatively large space is required to store the scrap tires.

SUMMARY OF THE INVENTION

The object of the present invention is to provide an apparatus for cutting scrap tires in order to reduce greatly the space for storing the scrap tires.

According to the present invention, an apparatus for cutting a scrap tire comprises a base with a top face, a vertical shaft mounted on the base, a tire support mounted rotatably on the vertical shaft, and first and second cutting units. The first cutting unit is mounted on the base and is adapted to cut the scrap tire along a first plane that is parallel to the top face of the base. The first cutting unit includes a first movable seat that is slidable on the top face of the base, a first stationary seat which is fixed on the top face of the base and which is spaced apart radially from the vertical shaft, a first hydraulic cylinder mounted on the top face of the base and connected to the first movable seat in order to move the first movable seat toward the first stationary seat so as to be adapted to clamp the scrap tire against the first stationary seat, a first cutter mounted on the first movable seat and adapted to cut the scrap tire when the scrap tire is clamped between the first movable and stationary seats, and a driving mechanism mounted on the base for actuating the first cutter to cut the scrap tire when the scrap tire is clamped between the first movable and stationary seats. The second cutting unit is mounted on the base and is adapted to cut the scrap tire along a second plane that is perpendicular to the top face of the base. The second cutting unit includes a second movable seat that is slidable on the top face of the base, a second stationary seat which is fixed on the top face of the base and which is spaced apart radially from the vertical shaft and angularly from the first stationary seat, a second hydraulic cylinder mounted on the top face of the base and connected to the second movable seat in order to move the second movable seat toward and away from the second stationary seat, a second cutter mounted on the second movable seat, and a third cutter mounted on the second stationary seat. The second movable seat and the second stationary seat clamp the scrap tire therebetween when the second hydraulic cylinder moves the second movable seat toward the second stationary seat in order to enable the second and third cutters to shear cooperatively the scrap tire.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
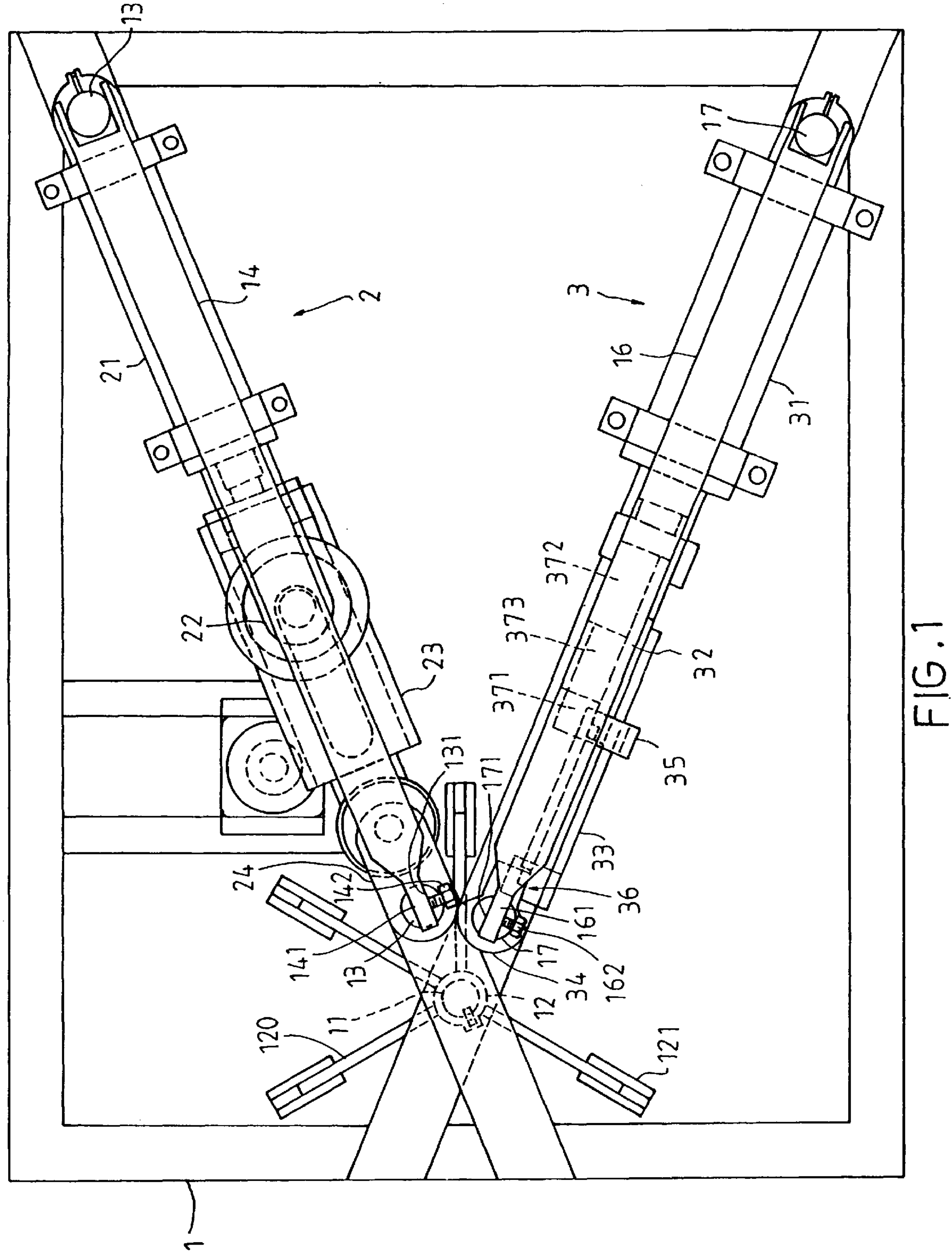
FIG. 1 is a top view of a preferred embodiment of an apparatus for cutting a scrap tire according to the present invention.
Figure 2:
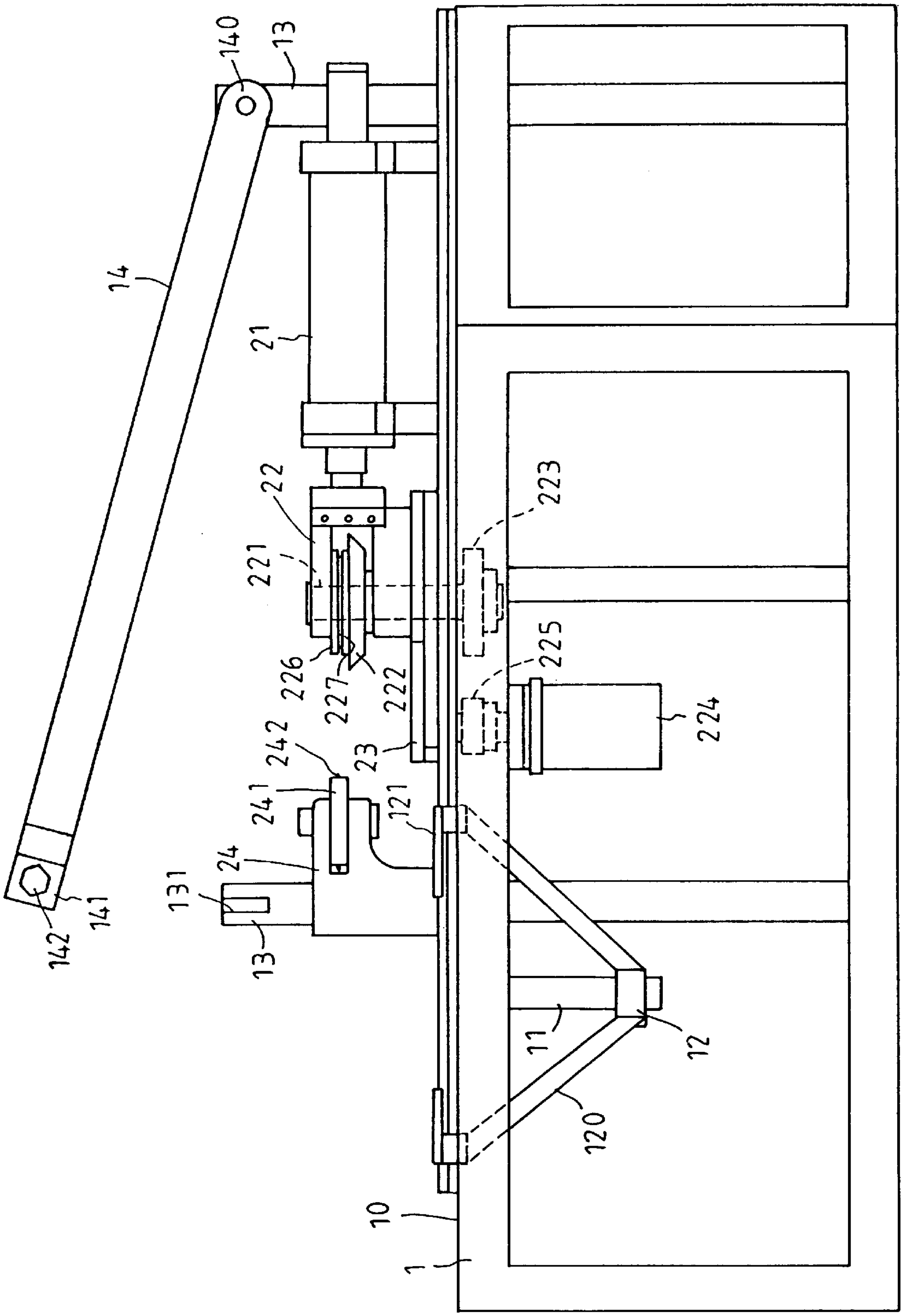
FIG. 2 is a side view of a first cutting unit of the preferred embodiment of the cutting apparatus according to the present invention.
Figure 3:
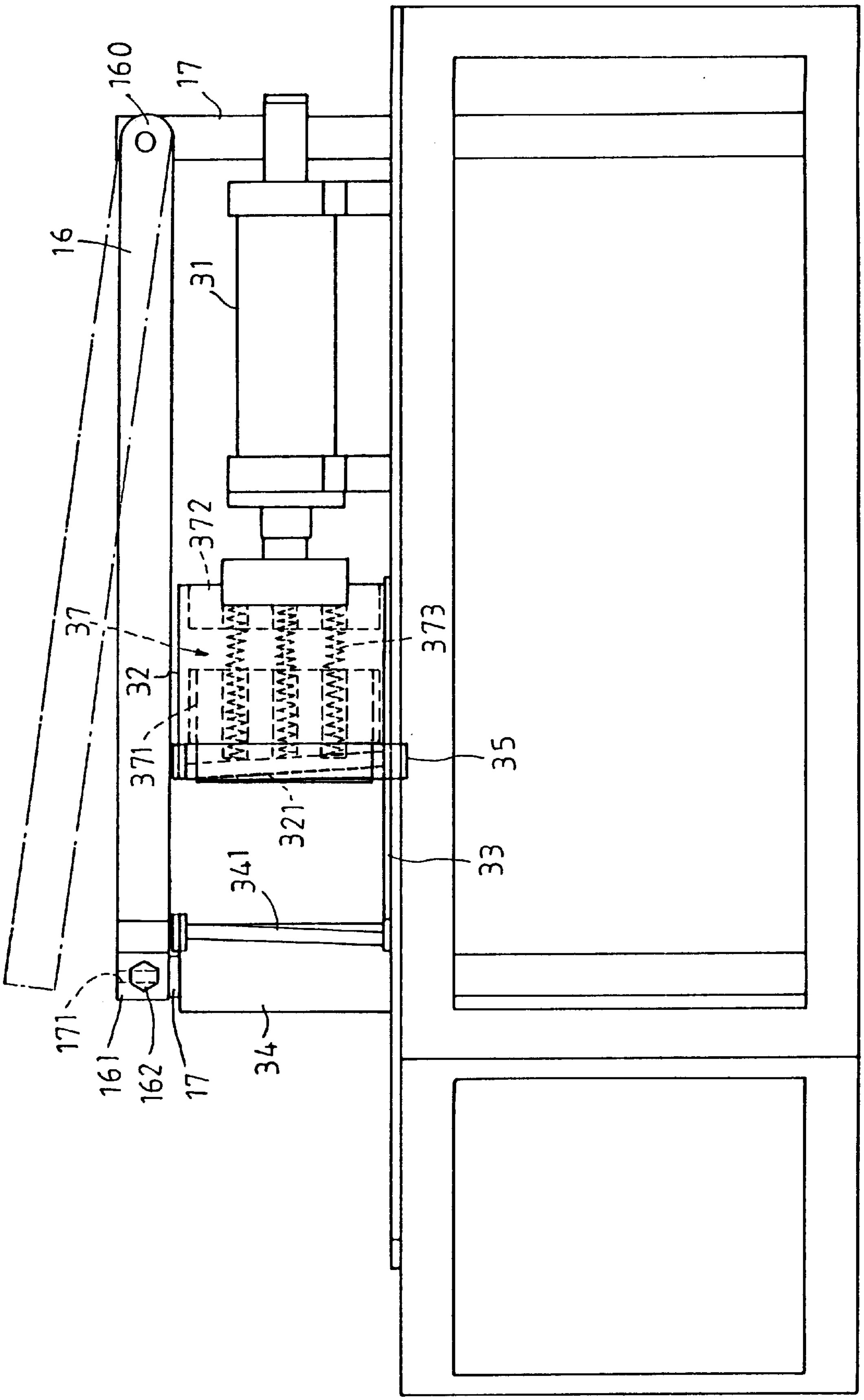
FIG. 3 is a side view of a second cutting unit of the preferred embodiment of the cutting apparatus according to the present invention.

Referring to FIGS. 1, 2 and 3, a preferred embodiment of an apparatus for cutting a scrap tire according to the present invention is shown to comprise a base 1, a first cutting unit 2 and a second cutting unit 3. The base 1 has a vertical shaft 11 fixed to the bottom of a top face 10 thereof. A tire support 12 is mounted rotatably on the vertical shaft 11. The tire support 12 is movable vertically relative to the vertical shaft 11 for adjustment of the height relative to the top face 10 of the base 1. The tire support 12 has a plurality of oblique arms 120 which extend upwardly and radially of the vertical shaft 11 and which include upper ends with horizontal support plates 121 adapted to support the scrap tire 15, as best illustrated in FIG. 4.

Figure 4:
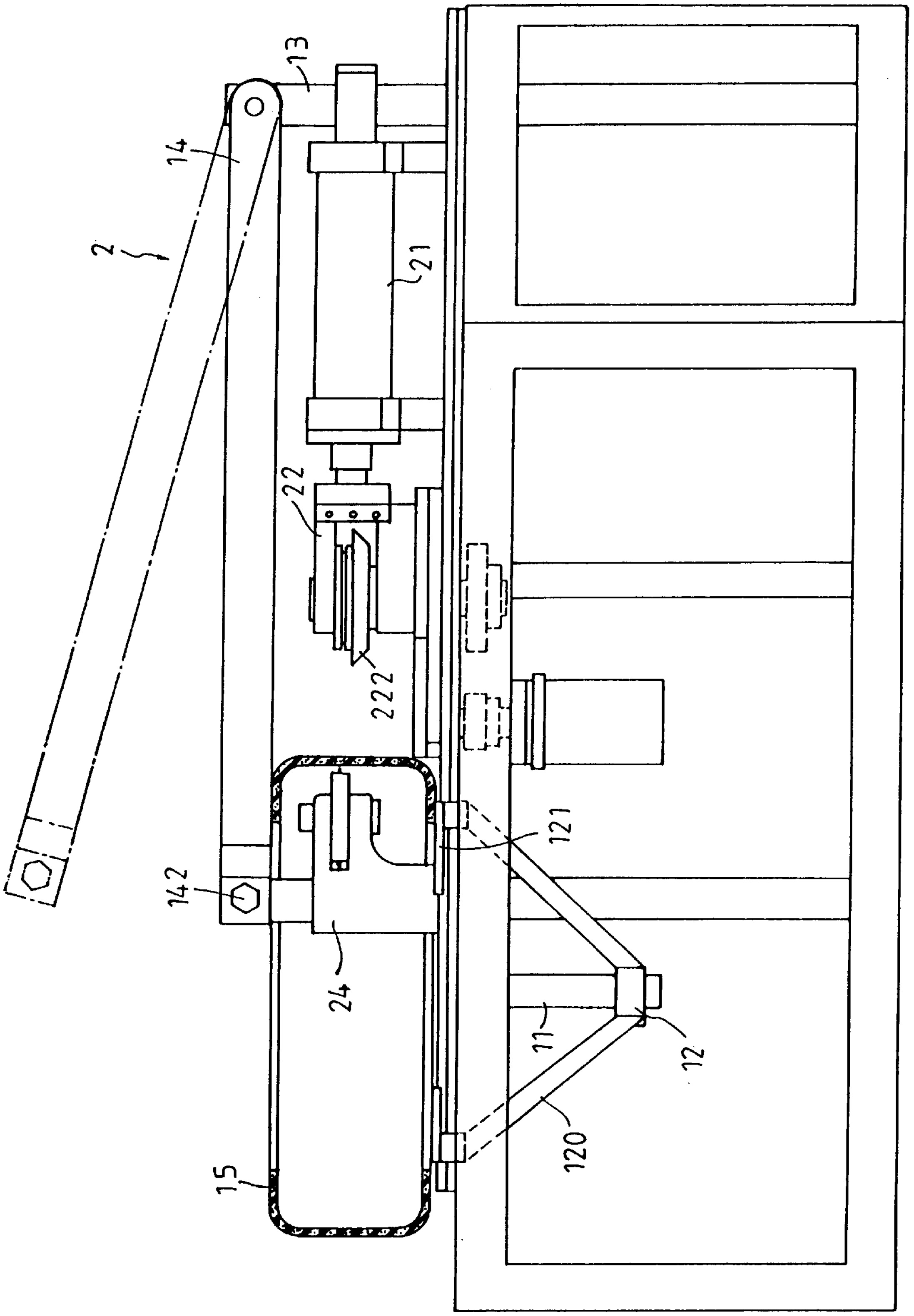
FIG. 4 shows how a scrap tire is placed on the preferred embodiment of the cutting apparatus according to the present invention.
Figure 5:
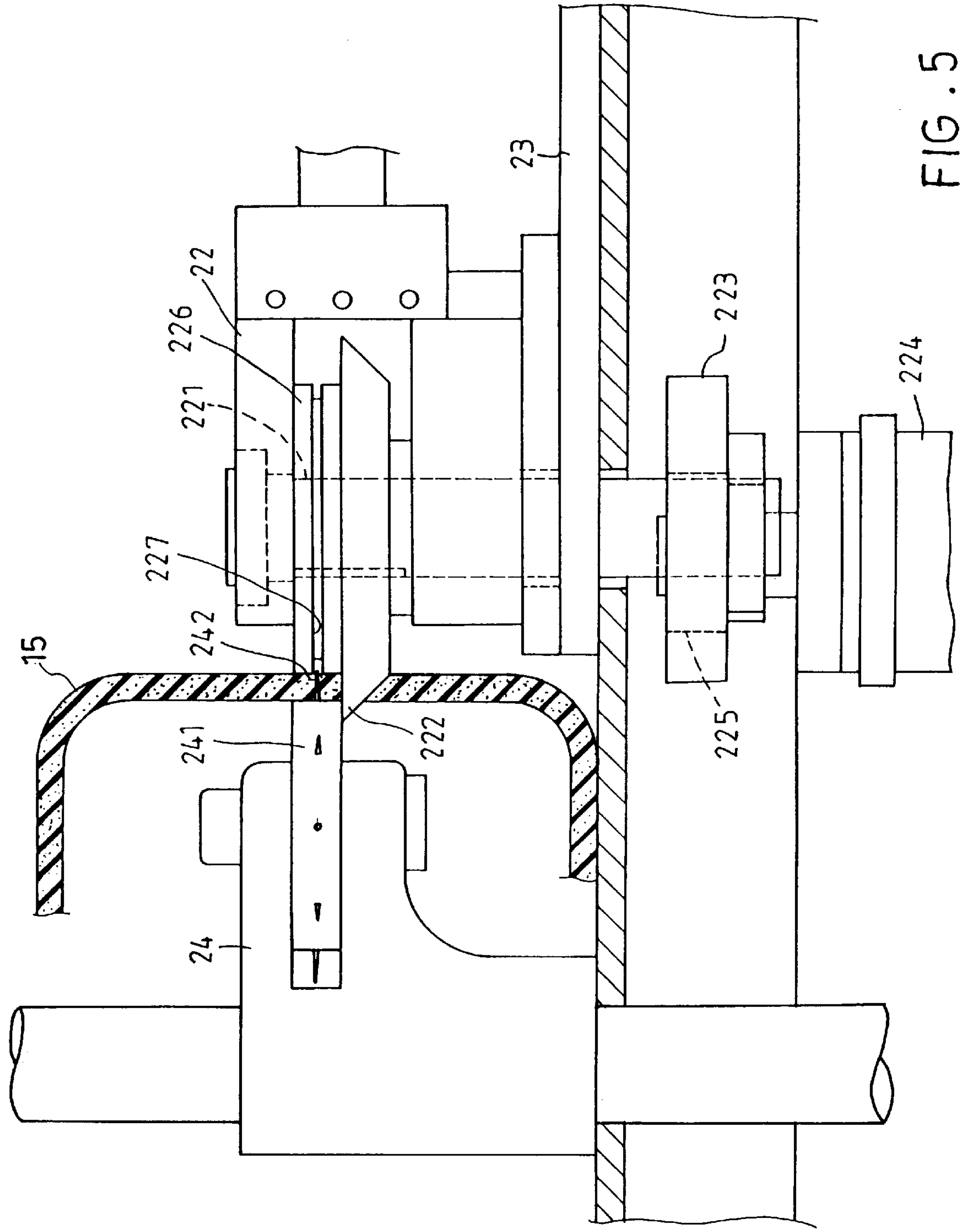
FIG. 5 is an enlarged fragmentary view illustrating how the scrap tire is cut by the first cutting unit of the preferred embodiment according to the present invention.

The first cutting unit 2 includes a first movable seat 22 that is slidable on the top face 10 of the base 1, a first stationary seat 24 which is fixed on the top face 10 and which is spaced apart radially from the vertical shaft 11, a first hydraulic cylinder 21 that is fixed on the top face 10 and that is connected so as to be adapted to the first movable seat 22 in order to move the first movable seat 22 toward the first stationary seat 24 to clamp the scrap tire 15 against the first stationary seat 24, a circular first cutter 222 mounted on the first movable seat 22 and adapted to cut the scrap tire 15 when the scrap tire 15 is clamped between the first movable and stationary seats 22, 24, as best illustrated in FIG. 4, and a driving mechanism mounted on the base for actuating the first cutter 222 to cut the scrap tire 15 when the scrap tire 15 is clamped between the first movable and stationary seats 22, 24, as best illustrated in FIG. 5.

Referring to FIG. 2, the driving mechanism includes a motor 224, an output gear shaft 225, a transmission shaft 221 that extends rotatably through the movable seat 22, and a driven gear 223 fixed to the transmission shaft 221. The first cutter 222 is fixed coaxially on the transmission shaft 221. The first stationary seat 24 has a thrust roller 241 mounted rotatably thereon. The first movable seat 22 has a press roller 226 mounted on the transmission shaft 221. The thrust roller 241 has a roughened periphery face and a plurality of needles 242 projecting from the roughened periphery face. The press roller 226 has an annular groove 227 formed along a periphery thereof and aligned with the thrust roller 241 to permit insertion of the needles 242 into the annular groove 227 through the scrap tire 15 when the scrap tire 15 is clamped between the second movable and stationary seats 22, 24, as best illustrated in FIG. 5.

Figure 7:
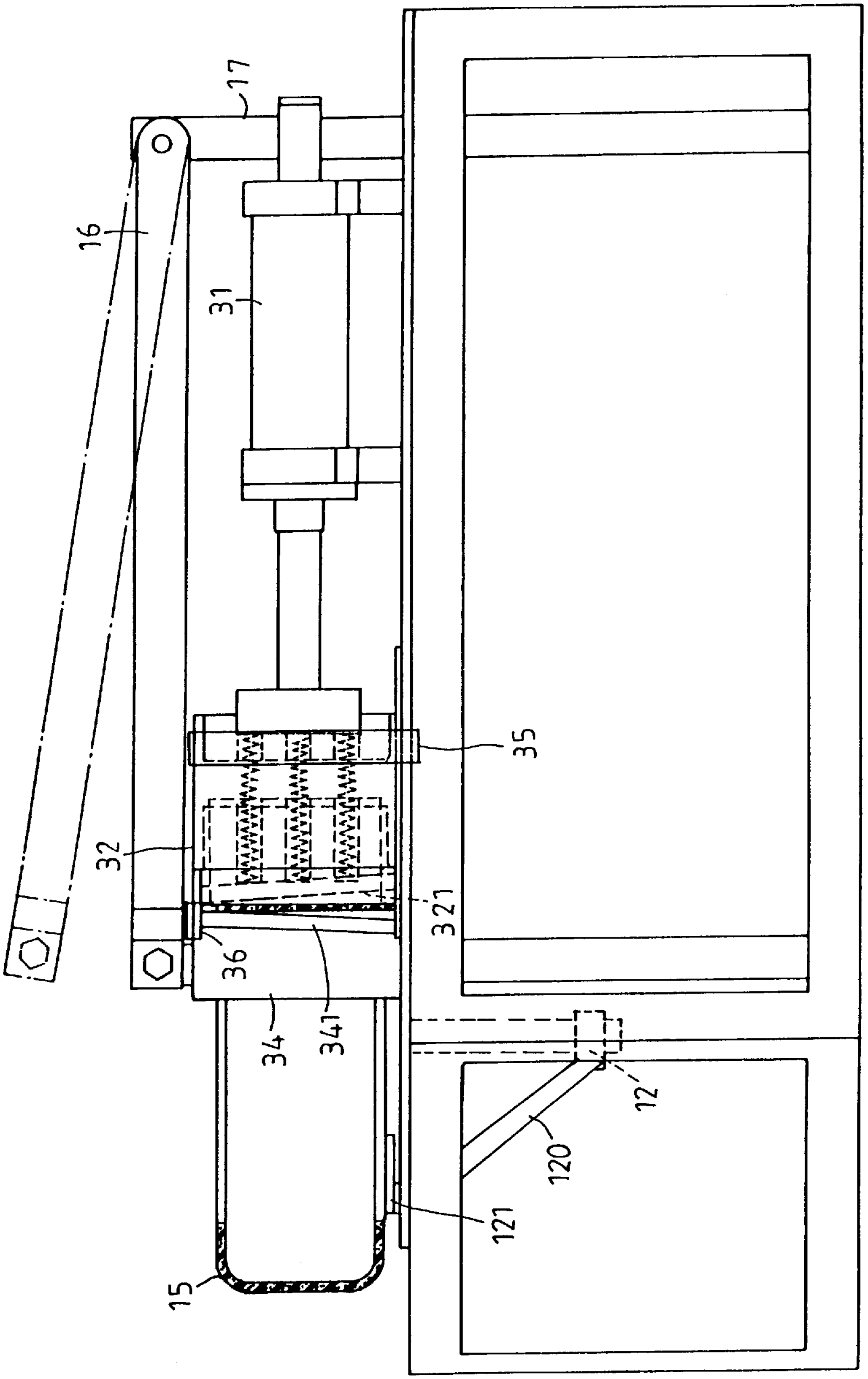
FIG. 7 is a side view illustrating how the second cutting unit cuts the scrap tire.

Referring to FIGS. 1 and 3, the second cutting unit 3 is mounted on the top face 10 of the base 1 and is adapted to cut the scrap tire 15 along a second plane that is perpendicular to the top face 10 of the base 1. The second cutting unit includes a second movable seat 32 that is slidable on the top face 10, a second stationary seat 34 which is fixed on the top face 10 of the base 1 and which is spaced apart radially from the vertical shaft 11 and angularly from the first stationary seat 24, a second hydraulic cylinder 31 fixed on the top face 10 and connected to the second movable seat 32 in order to move the second movable seat 32 toward and away from the second stationary seat 34, a second cutter 321 mounted on the second movable seat 32, and a third cutter 341 mounted on the second stationary seat 34. The second movable seat 32 and the second stationary seat 34 are adapted to clamp the scrap tire 15 therebetween when the second hydraulic cylinder 31 moves the second movable seat 32 toward the second stationary seat 34 in order to enable the second and third cutters 321, 341 to form scissors that shear cooperatively the scrap tire 15, as best illustrated in FIG. 7. The top face 10 of the base 1 has first and second slide grooves 23, 33 which extend radially relative to the vertical shaft 11 to guide the first and second movable seats 22, 32 to slide on the top face 10, respectively. An inverted U-shaped guide member 35 is fixed on the top face 10 of the base 1 above the second slide groove 33 to receive slidably atop portion of the second movable seat 32. The second stationary seat 34 has a top guiding groove 36 within which a part of the top portion of the second movable seat 32 engages when the second movable seat 32 is moved toward the second stationary seat 34.

Referring to FIGS. 1, 2 and 3, the base 1 has first and second pairs of upright posts 13, 17 fixed thereon. The first stationary seat 24 and the first hydraulic cylinder 21 are fixed respectively to the first pair of upright posts 13. The second stationary seat 34 and the second hydraulic cylinder 31 are fixed respectively to the second pair of upright posts 17. A first connecting lever 14 bridges and interconnects top ends of the first pair of upright posts 13. The first connecting lever 14 has a first end 140 connected pivotally to one of the first pair of upright posts 13, and a second end 141 connected detachably to the other one of the first pair of upright posts 13. The top end of the other one of the first pair of upright posts 13 is formed with a T-shaped notch 131 within which the second end 141 of the first connecting lever 14 is received. A bolt-and-nut fastener 142 is provided on the second end 141 of the first connecting lever 14 in order to secure releaseably the latter to the other one of the first pair of upright posts 13. A second connecting lever 16 bridges and interconnects top ends of the second pair of upright posts 17. The second connecting lever 16 has a first end 160 connected pivotally to one of the second pair of upright posts 17, and a second end 161 connected detachably to the other one of the second pair of upright posts 17. The top end of the other one of the second pair of upright posts 17 is formed with a T-shaped notch 171 within which the second end 161 of the second connecting lever 16 is received. A bolt-and-nut fastener 162 is provided on the second end 161 of the second connecting lever 16 in order to secure releaseably the latter to the other one of the second pair of upright posts 17.

Referring to FIG. 3, the second movable seat 32 has a push device 37 mounted thereon. The push device includes a stop block 372 fixed to the second hydraulic cylinder 31, a tire pressing block 371 that is movable with respect to the second movable seat 32, and a plurality of compression springs 373 disposed between the stop block 372 and the tire pressing block 371.

In use, the second ends 141, 161 of the first and second connecting levers 14, 16 are disengaged respectively from the T-shaped notches 131, 171 in the first and second pairs of upright posts 13, 17. The first and second connecting levers 14, 16 are pivoted upwardly in order to place the scrap tire 15 on the tire support 12 with a part of the scrap tire 15 being located between the first and second movable seats 22, 32 and the first and second stationary seats 24, 34, as best illustrated in FIGS. 4 and 7. Then, the second ends 141, 161 of the first and second connecting levers 14, 16 are secured respectively in the T-shaped notches 131, 171.

Referring to FIGS. 4 and 5, the tire support 12 is moved vertically so as to adjust the height of the scrap tire 15 relative to the top face 10 of the base 1 until the central line of the cross-section of the scrap tire 15 is aligned with the cutting edge of the circular first cutter 222. The first hydraulic cylinder 21 is then actuated to drive the first movable seat 22 to move along the first slide groove 23 to permit engagement between the driven gear 223 and the output gear shaft 225 of the motor 224. At this time, the press roller 226 and the thrust roller 241 clamp firmly the scrap tire 15 therebetween to enable the needles 242 to pierce through the scrap tire 15 into the annular groove 227 in the press roller 226. Furthermore, the first cutter 222 below the press roller 226 cut through the scrap tire 15 to hold the scrap tire 15 in position. The motor 225 is then actuated to drive the first cutter 222 to rotate via the transmission shaft 221. Since the cutting edge of the first cutter 222 is located right below the thrust roller 241, the scrap tire 15 can be cut laterally by virtue of shearing action of the first cutter 222 and the thrust roller 241. In addition, because the thrust roller 241 and the press roller 266 have peripheral faces that abut against the scrap tire 15, as well as the needles 242 that pierce through the scrap tire 15, the scrap tire 15 will be rotated about the vertical shaft 11 when the first cutter 222 rotate. After the scrap tire 15 is rotated by an angle that is formed between the first and second slide grooves 23, 33, the motor 224 is deactivated to stop the first cutter 222. It is noted that the overall structure of the first cutting unit 2 can withstand a large thrusting force that is exerted onto the stationary seat 24 and the first hydraulic cylinder 21 during the cutting process due to the integral connection of the first connecting lever 14 and the first pair of upright posts 13.

Figure 6:
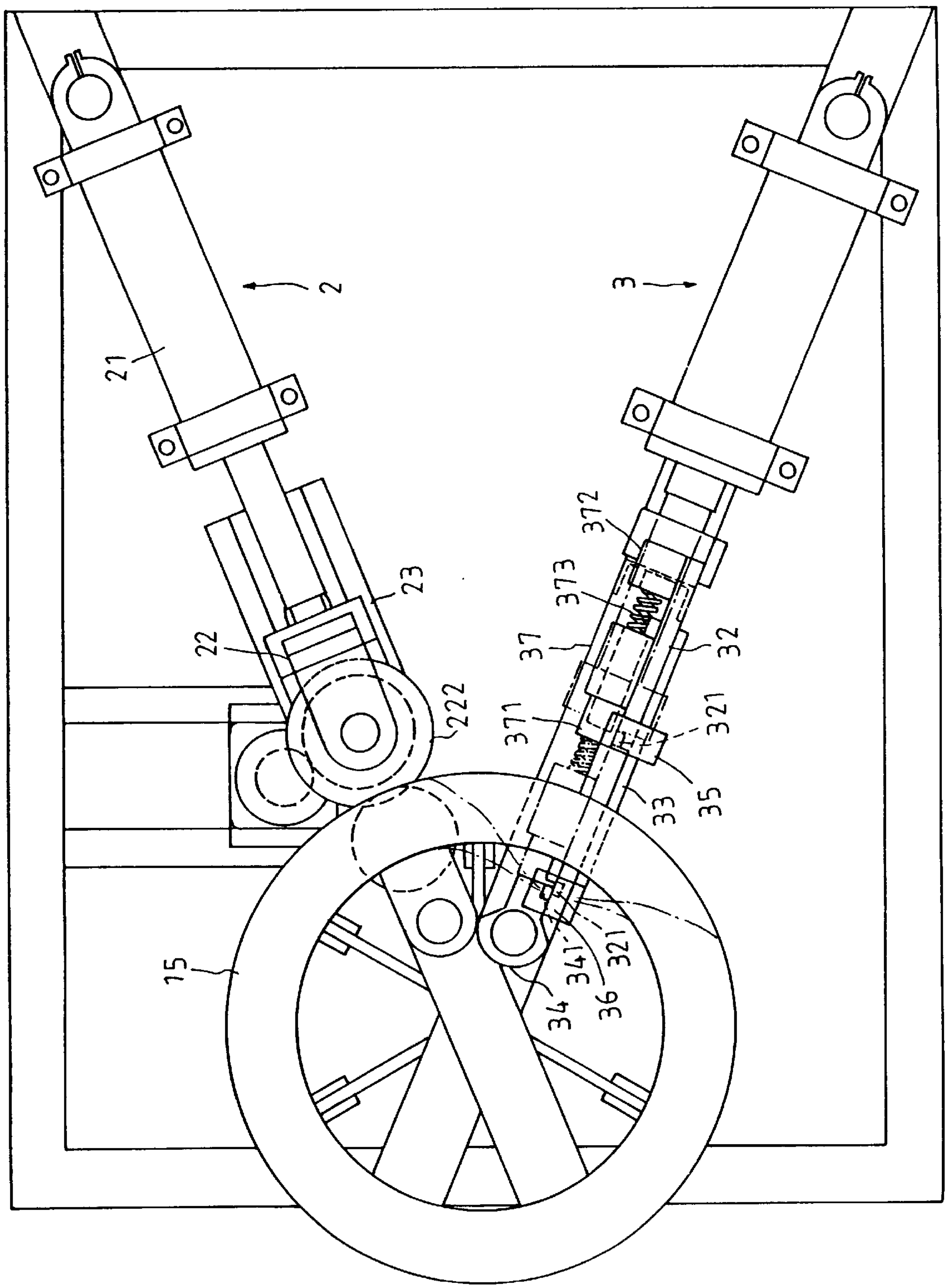
FIG. 6 is a top view illustrating how the second cutting unit is operated to cut the scrap tire.

Next, with reference to FIGS. 6 and 7, the second hydraulic cylinder 31 is actuated to drive the second movable seat 32 to move along the second slide groove 33 toward the stationary seat 34 until the top portion of the front end of the second movable seat 32 is guided by and engages the top guiding groove 36 of the second stationary seat 34. At this time, the top portion of the rear end of the second movable seat 32 is received by the guide member 35, as shown by the phantom lines in FIG. 6. When the second movable seat 32 is moving toward the second stationary seat 34, the tire pressing block 371 first presses the scrap tire 15 against the second stationary seat 34, and moves toward the stop block 372 against the spring force of the compression springs 373. When the second movable seat 32 further advances, the second cutter 321 is exposed from second movable seat 32 and shears the scrap tire 15 cooperatively with the third cutter 341 along the second plane that is perpendicular to the top face 10 of the base 1. It is noted that, when the second and third cutters 321, 341 engage one another and shear the scrap tire 15, opposed walls of the second slide groove 33, the guide member 35 and the top guiding groove 36 withstand the sideward force exerted on the second movable seat 32 by the second and third cutters 321, 341 in order to protect the second movable seat 32 from damage. In addition, the second connecting lever 16 and the second pair of upright posts 17 withstand a great thrusting force exerted on the second stationary seat 34 and the second hydraulic cylinder 31. Therefore, the overall structural strength of the second cutter unit 3 is enhanced.

After the second and third cutters 321, 341 cut the scrap tire 15, the second hydraulic cylinder 31 is actuated to move the second movable seat 32 away from the second stationary seat 34. The motor 224 is then actuated to drive the first cutter 222 to cut the scrap tire 15 laterally by the predetermined angle. The second hydraulic cylinder 31 is actuated to drive the second movable seat 32 toward the second stationary seat 34 to enable the second and third cutters 321, 341 to cut the scrap tire 15. In this way, the scrap tire 15 can be cut into pieces, thereby reducing greatly the space for storing the scrap tire 15.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

We claim:

1. An apparatus for cutting a scrap tire, comprising:

a base with a top face;

a vertical shaft mounted on said base;

a tire support mounted rotatably on said vertical shaft;

a first cutting unit mounted on said base and adapted to cut the scrap tire along a first plane that is parallel to said top face of said base, said first cutting unit including a first movable seat that is slidable on said top face of said base a first stationary seat which is fixed on said top face of said base and which is spaced apart radially from said vertical shaft, a first hydraulic cylinder mounted on said top face of said base and connected to said first movable seat in order to move said first movable seat toward said first stationary seat so as to be adapted to clamp the scrap tire against said first stationary seat, a first cutter mounted on said first movable seat and adapted to cut the scrap tire when the scrap tire is clamped between said first movable and stationary seats and a driving mechanism mounted on said base for actuating said first cutter to cut the scrap tire when the scrap tire is clamped between said first movable and stationary seats; and a second cutting unit mounted on said base and adapted to cut the scrap tire along a second plane that is perpendicular to said top face of said base, said second cutting unit including a second movable seat that is slidable on said top face of said base, a second stationary seat which is fixed on said top face of said base and which is spaced apart radially from said vertical shaft and angularly from said first stationary seat, a second hydraulic cylinder mounted on said top face of said base and connected to said second movable seat in order to move said second movable seat toward and away from said second stationary seat, a second cutter mounted on said second movable seat, and a third cutter mounted on said second stationary seat, said second movable seat and said second stationary seat being adapted to clamp the scrap tire therebetween when said second hydraulic cylinder moves said second movable seat toward said second stationary seat in order to enable said second and third cutters to shear cooperatively the scrap tire;

said second movable seat has a push device mounted thereon, said push device including a stop block fixed to said second hydraulic cylinder, a tire pressing block that is movable with respect to said second movable seat, and a spring member disposed between said stop block and said tire pressing block.

2. The apparatus for cutting a scrap tire as claimed in claim 1, wherein said first stationary seat has a thrust roller mounted rotatably thereon, said first movable seat having a press roller mounted rotatably thereon.

3. The apparatus for cutting a scrap tire as claimed in claim 2, wherein said thrust roller has a roughened periphery face and a plurality of needles projecting from said roughened periphery face, said press roller having an annular groove formed along a periphery thereof and aligned with said thrust roller to permit insertion of said needles into said annular groove through the scrap tire when the scrap tire is clamped between said second movable and stationary seats.

4. The apparatus for cutting a scrap tire as claimed in claim 1, wherein said tire support is movable vertically relative to said vertical shaft for adjustment of a height relative to said top face of said base, said tire support having a plurality of oblique arms which extend upwardly and radially of said vertical shaft and which include upper ends adapted to support the scrap tire.

5. The apparatus for cutting a scrap tire as claimed in claim 1, wherein said base has first and second pairs of upright posts fixed thereon, said first stationary seat and said first hydraulic cylinder being fixed respectively to said first pair of upright posts, said second stationary seat and said second hydraulic cylinder being fixed respectively to said second pair of upright posts.

6. The apparatus for cutting a scrap tire as claimed in claim 5, further comprising a first connecting lever that bridges and interconnects top ends of said first pair of upright posts, said first connecting lever having a first end connected pivotally to one of said first pair of upright posts, and a second end connected detachably to the other one of said first pair of upright posts.

7. The apparatus for cutting a scrap tire as claimed in claim 6, further comprising a second connecting lever that bridges and interconnects top ends of said second pair of upright posts, said second connecting lever having a first end connected pivotally to one of said second pair of upright posts, and a second end connected detachably to the other one of said second pair of upright posts.

8. An apparatus for cutting a scrap tire, comprising:

a base with a top face, said top face having first and second slide grooves;

a vertical shaft mounted on said base, said first and second slide grooves extending radially relative to said vertical shaft;

a tire support mounted rotatably on said vertical shaft;

a first cutting unit mounted on said base and adapted to cut the scrap tire along a first plane that is parallel to said top face of said base, said first cutting unit including a first movable seat that is slidable on said top face of said base, a first stationary seat which is fixed on said top face of said base and which is spaced apart radially from said vertical shaft, a first hydraulic cylinder mounted on said top face of said base and connected to said first movable seat in order to move said first movable seat toward said first stationary seat so as to be adapted to clamp the scrap tire against said first stationary seat, a first cutter mounted on said first movable seat and adapted to cut the scrap tire when the scrap tire is clamped between said first movable and stationary seats, and a driving mechanism mounted on said base for actuating said first cutter to cut the scrap tire when the scrap tire is clamped between said first movable and stationary seats; and a second cutting unit mounted on said base and adapted to cut the scrap tire along a second plane that is perpendicular to said top face of said base, said second cutting unit including a second movable seat that is slidable on said top face of said base, a second stationary seat which is fixed on said top face of said base and which is spaced apart radially from said vertical shaft and angularly from said first stationary seat, a second hydraulic cylinder mounted on said top face of said base and connected to said second movable seat in order to move said second movable seat toward and away from said second stationary seat, a second cutter mounted on said second movable seat, and a third cutter mounted on said second stationary seat, said second movable seat and said second stationary seat being adapted to clamp the scrap tire therebetween when said second hydraulic cylinder moves said second movable seat toward said second stationary seat in order to enable said second and third cutters to shear cooperatively the scrap tire, said first and second movable seats to slide on said top face of said base, respectively;

an inverted U-shaped guide member fixed on said top face of said base above said second slide groove, a top portion of said second movable seat being received slidably in said inverted U-shaped guide member, said second stationary seat having a top guide groove within which a part of said top portion of said second movable seat engages when said second movable seat is moved toward said second stationary seat.

9. The apparatus for cutting a scrap tire as claimed in claim 8, wherein said first stationary seat has a thrust roller mounted rotatably thereon, said first movable seat having a press roller mounted rotatably thereon.

10. The apparatus for cutting a scrap tire as claimed in claim 9, wherein said thrust roller has a roughened periphery face and a plurality of needles projecting from said roughened periphery face, said press roller having an annular groove formed along a periphery thereof and aligned with said thrust roller to permit insertion of said needles into said annular groove through the scrap tire when the scrap tire is clamped between said first movable and stationary seats.

11. The apparatus for cutting a scrap tire as claimed in claim 8, wherein said tire support is movable vertically relative to said vertical shaft for adjustment of a height relative to said top face of said base, said tire support having a plurality of oblique arms which extend upwardly and radially of said vertical shaft and which include upper ends adapted to support the scrap tire.

12. The apparatus for cutting a scrap tire as claimed in claim 8, wherein said base has first and second pairs of upright posts fixed thereon, said first stationary seat and said first hydraulic cylinder being fixed respectively to said first pair of upright posts, said second stationary seat and said second hydraulic cylinder being fixed respectively to said second pair of upright posts.

* * * * *